(12) United States Patent
Joly

(10) Patent No.: US 6,776,958 B1
(45) Date of Patent: Aug. 17, 2004

(54) METHOD AND DEVICE FOR TREATING A HEAVILY LOADED LIQUID EFFLUENT IN PARTICULAR WITH NITROGEN AND WITH PHOSPHORUS

(75) Inventor: Claude Joly, Meylan (FR)

(73) Assignee: Fibac, Grenoble (FR)

( * ) Notice: Subject to any disclaimer, the term of this patent is extended or adjusted under 35 U.S.C. 154(b) by 0 days.

(21) Appl. No.: 09/508,094

(22) PCT Filed: Sep. 3, 1998

(86) PCT No.: PCT/FR98/01881

§ 371 (c)(1),
(2), (4) Date: Jun. 2, 2000

(87) PCT Pub. No.: WO99/14162

PCT Pub. Date: Mar. 25, 1999

(30) Foreign Application Priority Data

Sep. 16, 1997 (FR) .......................................... 97 11478

(51) Int. Cl.[7] .............................................. A61L 2/00
(52) U.S. Cl. ..................... 422/28; 210/747; 210/750; 210/766; 210/903; 422/1; 422/3; 422/32
(58) Field of Search .......................... 422/1, 3, 28, 32; 210/747, 750, 766, 903

(56) References Cited

U.S. PATENT DOCUMENTS

| 4,093,544 A | | 6/1978 | Ross ............................ 210/59 |
| 4,137,158 A | * | 1/1979 | Ishida et al. ................. 210/605 |
| 4,689,156 A | | 8/1987 | Zibrida ....................... 210/747 |
| 4,710,300 A | * | 12/1987 | Kristoufek ................... 210/603 |
| 5,653,149 A | * | 8/1997 | Cavanagh ..................... 74/545 |
| 5,849,194 A | * | 12/1998 | Yamasaki et al. ........... 210/614 |

FOREIGN PATENT DOCUMENTS

| FR | 2 438 627 | 5/1980 |
| FR | 2 573 746 | 5/1986 |

* cited by examiner

Primary Examiner—Krisanne Thornton
(74) Attorney, Agent, or Firm—Jacobson Holman PLLC

(57) ABSTRACT

A device for treating a liquid effluent such as pig slurry containing significant quantities of nitrogen and phosphorus, the device including a mixing reactor for contacting the liquid effluent with the basic reagent, provided with an intake for said effluent and another intake for the basic reagent; an ammonia-extracting reactor, connected to the mixing reactor, and a tank for storing the treated liquid effluent derived from the ammonia-extracting reactor.

20 Claims, 1 Drawing Sheet

METHOD AND DEVICE FOR TREATING A HEAVILY LOADED LIQUID EFFLUENT IN PARTICULAR WITH NITROGEN AND WITH PHOSPHORUS

BACKGROUND

1. Field of the Invention

The present invention relates to a method for treating a liquid effluent heavily loaded especially with nitrogen and phosphorus, and also a device for implementing this method.

2. Description of Related Art

Liquid effluents heavily loaded especially with nitrogen and phosphorus, whether of urban, agricultural or industrial origin, pose a serious problem especially in the field of the environment. All the developing controversy concerning the level of nitrate present in ground water must be borne in mind.

National and/or international legislations tend increasingly to prohibit any disposal of liquid effluents, in which the amount of nitrogenized material is greater than a threshold which is tending to fall as a result of action by various pressure groups. Likewise as regards phosphorus, legislation limits the quantities tolerated for materials which are to be spread as manure.

Furthermore, while a benefit from the above-mentioned liquid effluents is often obtained by spreading them as manure, the nauseating odor which results is a source of conflict with the surrounding neighborhood.

Amongst the liquid effluents heavily loaded especially with nitrogen and/or with phosphorus, primarily pig slurry should be mentioned, and also liquid sludge created by purification stations.

Indeed, a certain number of methods and/or devices have already been proposed for reducing the nuisance caused by the spreading of such liquid effluents, but none of these is entirely satisfactory, especially with respect to the regulations which are currently envisaged.

SUMMARY OF THE INVENTION

Thus, one of the aims of the present invention is to provide a method for treating a liquid effluent heavily loaded especially with nitrogen and with phosphorus, which allows the nitrogenized charge to be reduced at least to the legally acceptable threshold.

Another aim of the present invention is to provide a method of this nature which allows such liquid effluents to be deodorized.

An additional aim of the invention is to provide such a method which is simple to implement at low cost.

These aims, and also others which will later become apparent, are achieved by a method for treating a liquid effluent heavily loaded especially with nitrogen and with phosphorus according to the present invention, which includes the following stages:

a) the addition of a basic reagent to the liquid effluent to obtain a pH in the range from 8.5 to 13; and b) entrainment of the basified liquid effluent derived from stage a) in a stream of air.

Advantageously, the basic reagent added during stage a) is unslaked or slaked lime in the form of powder, paste or liquid. This reagent may have a lime concentration ($Ca(OH)_2$) up to 1000 g/liter of reagent.

Preferably, stage b) is repeated a certain number of times for the same basified effluent with the passage number typically being in the range from 1 to 50.

Advantageously, at the start of stage b) an anti-foam catalyst is added, the quantity of which varies from 0 to 1 liters per cubic meter of liquid effluent which is to be treated.

According to a preferred form of embodiment, the method in accordance with the present invention may comprise a third stage or stage c) of sifting of the liquid effluent derived from stage b).

As previously indicated, the present invention likewise concerns a device for implementing the above method, which is of low cost. This device comprises a mixing reactor for contacting the liquid effluent with the basic reagent, provided with an intake for this effluent and another intake for the basic reagent; an ammonia-extracting reactor, connected to the mixing reactor; and a tank for storing the treated liquid effluent derived from the ammonia-extracting reactor.

Advantageously, the mixing reactor comprises a device for measuring the pH of the medium connected to a means situated on the intake of basic reagent to automatically regulate the quantity thereof which is added.

Preferably, the ammonia-extracting reactor or degassing reactor comprises a lower part collecting especially the basified liquid effluent and an upper part in which is situated a diffusing rack provided with nozzles, connected to the lower part of the reactor which includes a feed pump. Openings are provided between the two parts so that the exterior air can enter, and an air exhaust fan is connected to the upper part. The nozzles of the diffusing rack are, for example, of the cyclone type.

Advantageously, the upper part of the degassing reactor is connected to a moisture-reducing unit.

BRIEF DESCRIPTION OF DRAWING

The following description, which is in no way restrictive in character, is to be read with reference to the single attached FIG. 1 which is a diagrammatic vertical section of a part of a device for implementing the method according to the present invention.

DETAILED DESCRIPTION OF PREFERRED EMBODIMENTS

Figure 1:
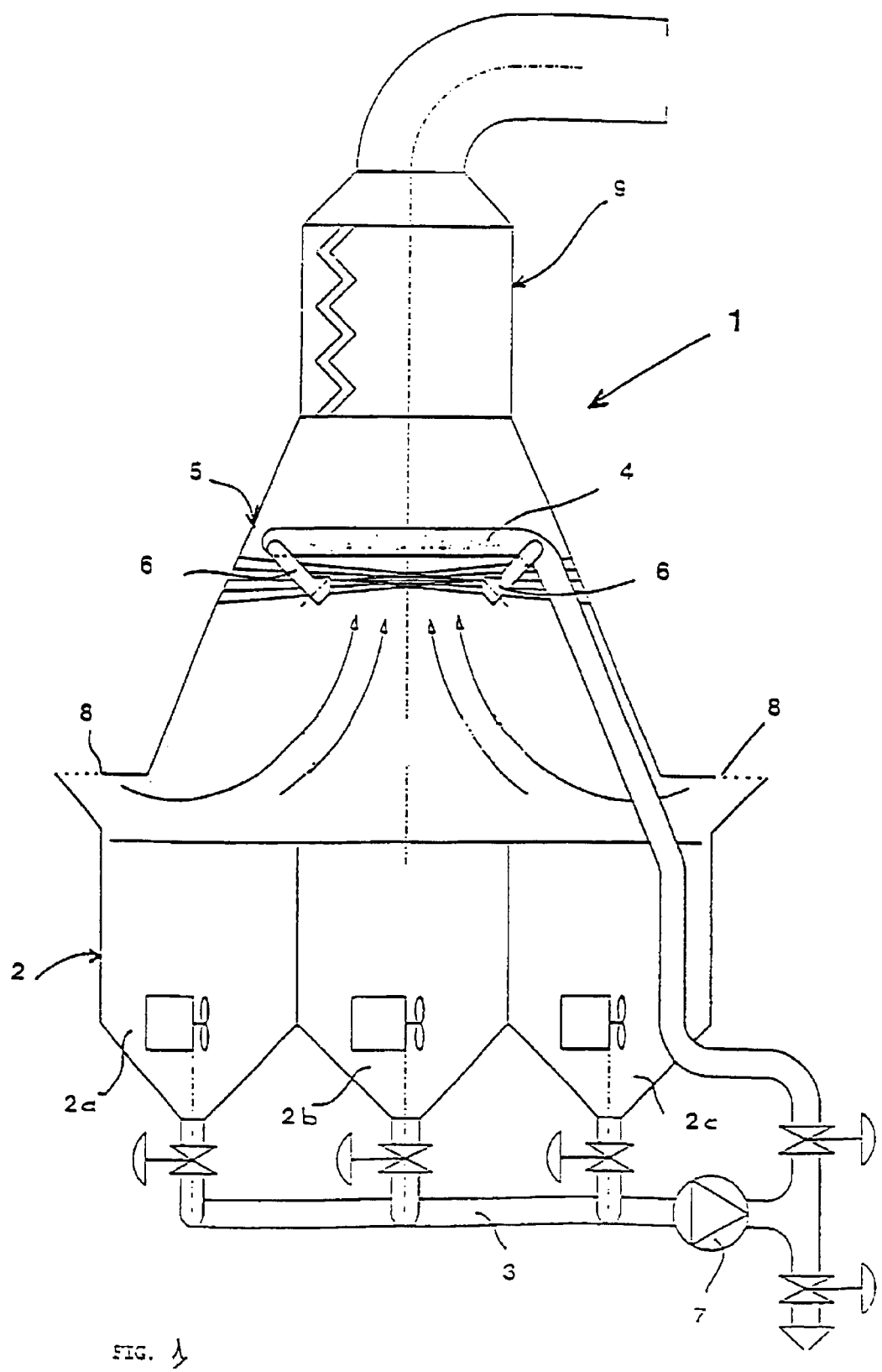

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In accordance with the invention, a method for treating a liquid effluent heavily loaded especially with nitrogen and/or with phosphorus comprises a first stage or stage a) of mixing a basic reagent with the liquid effluent which is to be treated. The pH of this effluent is thus brought to a value in the range from 8.5 to 13.

The basic reagent is essentially composed of unslaked or slaked lime, present in the form of powder, liquid or paste and being able to have a concentration reaching 1000 g of equivalent $Ca(OH)_2$ per liter of reagent.

This addition, by raising the pH, allows one to transform the nitrogenized compounds which are present in the liquid effluent in the form of ammonium ions, symbolized by the name $N-NH_4^+$ into gaseous ammonia ($NH_3$) dissolved in the liquid effluent.

Furthermore, the presence of lime leads to the precipitation, in the form of calcic compounds, of the phosphatic compounds present in this effluent in the form of orthophosphates. Likewise the sulphurated compounds which are emitted in the form of a bad-smelling gas, sulphur dioxide ($H_2S$), are transformed into calcium sulphate, an inert product.

In a second stage or stage b) for extraction of ammonia, the liquid effluent derived from the preceding stage is transferred and diffused in an air stream i.e., the gaseous ammonia ($NH_3$) is entrained by the air. The transformation of the ammonium ions into ammonia is all the faster since the pH is in the range from 9.5 to 12.5. The temperature of 70° C. maximum also increases the rate of degassing.

At the start of this stage b), an anti-foam catalyst can be added, the quantity of which varies from 0 to 1 l/m³ of liquid effluent which is to be treated.

The method in accordance with the invention possibly comprises a third stage, or stage c) of sifting, allowing the separation of the particles in suspension after decanting, before storing the liquid effluent which has been treated.

The present invention likewise concerns a device for implementing the method described above.

This device comprises, firstly, a mixing reactor, not shown in the figure, in which the first stage is carried out. This reactor comprises an intake for the liquid effluent and an intake for the basic reagent. It is provided with a stirring means for mixing as intimately as possible the liquid effluent to be treated with the basic reagent.

This mixing reactor may also comprise means for the regulation of flow arranged on the intake for the basic reagent which means is connected to a device for measuring the pH of the medium in reaction. The basic reagent, which is essentially made up of unslaked or slaked lime, is incorporated by sequences which are timed and repeated successively as many times as necessary until the desired pH is obtained; this can be realized automatically. Each incorporation sequence comprises four phases, namely measurement of the initial pH of the loaded liquid effluent; injection of dilution liquid of the basic reagent during a given time, for example 30 minutes, which liquid may be water, with this operation being able to be carried out in masked time; the incorporation of the basic reagent diluted in the effluent to be treated during a given time, for example during successive periods each of 20 seconds; and mixing of the effluent and of the basic reagent especially by stirring.

The duration of a sequence generally lasts from 30 minutes to 3 hours.

As shown in FIG. 1, the device in accordance with the present invention comprises, secondly, a degassing reactor designated as a whole by reference number 1 and connected to the mixing reactor.

This degassing reactor 1 is composed of two parts including a lower part 2 and an upper part 5. The lower part 2 is intended to receive the mixture derived from the mixing reactor and may, according to a preferred form of embodiment, be composed of several tanks 2a, 2b, 2c, each connected to the same evacuation pipe 3 towards a diffusing rack 4. The upper part 5 includes the diffusing rack 4 which is provided with nozzles 6, for example of the cyclone type, which is connected to the lower part 2 of the reactor and is provided at this level with a pump 7. This pump 7 draws, into the diffusing rack 4, the mixture present in the lower part 2. Openings 8 are arranged between the lower part 2 and upper part 5 to permit an intake of exterior air, with an exhaust fan, not shown, being connected to the upper part such that an air stream is formed. As regards the exhaust fan, it causes a circulation of the air which is charged with ammonia whilst crossing the sheet of droplets of the mixture derived from the diffusing rack 4.

The rack 4 can also comprise an intake for an anti-foam product; the latter has the aim of maintaining a regular fluidity to the basified liquid effluent.

The product derived from the nozzles is recovered in the upper part and recycled towards the diffusing rack. The number of cycles can reach 50, to obtain a given level of extraction of fixed ammoniacal nitrogen.

The treated liquid effluent derived from the degassing stage b) is conveyed towards storage tanks, possibly after sifting to eliminate especially the phosphatic compounds.

As regards the air drawn in the upper part, it is drawn out from the degassing reactor and is conveyed through a moisture-reducing unit 9 so as to relieve it of the droplets of liquid with which it has become loaded.

This air loaded with ammonia is returned into the atmosphere if the concentration thereof is lower than the authorized ejection standards, or treated in a washing tower or by any other means allowing the ammonia to be collected or eliminated.

When the air loaded with ammonia is treated, the air which is thus purified can be recycled towards the openings arranged between the lower part and upper part of the degassing reactor.

To remove 80% of the ammoniacal nitrogen contained in a pig slurry, the device in accordance with the present invention allows approximately 1 to 4 m³ of slurry to be treated per hour; the flow of air must be in the range from 6,000 to 15,000 m³/h.

To remove 60% of the ammoniacal nitrogen, this device allows approximately 2 to 8 m³/h pig slurry to be treated, with the same air flow as above.

To remove 40% of the ammoniacal nitrogen, this device allows approximately 3 to 10 m³/h pig slurry to be treated, the air flow being the same.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for treating a liquid effluent of animal manure loaded with nitrogen and phosphorus, comprising the steps of:
   a) adding a basic reagent to a liquid effluent of animal manure containing more than 500 ppm of nitrogen as ammonia and phosphorus to obtain a pH in a range from 8.5 to 13;
   b) diffusing the basified liquid effluent of said animal manure derived from stage a) in a stream of air having a flow rate of from about 6,000 to 15,000 m³/hr; and
   c) removing up to 80% of the ammoniacal nitrogen from said animal manure.

2. The method according to claim 1, wherein the basic reagent added to stage a) is unslaked or slaked lime in the form of powder, paste or liquid.

3. The method according to claim 2, wherein a concentration of lime $Ca(OH)_2$ is a maximum of 1,000 g/litre of reagent.

4. The method according to claim 3, wherein the stage b) is repeated a number of times for the same basified effluent.

5. The method according to claim 4, wherein the number of repetitions is in the range from 1 to 50.

6. The method according to claim 1, wherein at a start of stage b) an anti-foam catalyst is added, the quantity of which varies from 0 to 1 l/m³ of liquid effluent which is to be treated.

7. The method according to claim 1, further comprising in stage c) a step of sifting the liquid effluent derived from stage b).

8. A device for treating a liquid effluent of animal manure loaded with nitrogen and phosphorus by adding a basic reagent to said liquid effluent to obtain a pH in the range from 8.5 to 13 and diffusing the basified liquid effluent derived in a stream of air, the device comprising:

a mixing reactor for bringing a liquid effluent of animal manure containing more than 500 ppm of nitrogen as ammonia and phosphorus into contact with the basic reagent, said mixing reactor provided with an intake for said effluent and another intake for the basic reagent;

an ammonia-extracting reactor connected to the mixing reactor for extracting us to 80% of the ammoniacal nitrogen from said animal manure; and a tank for storing the treated liquid effluent derived from the ammonia-extracting reactor.

9. The device according to claim 8, wherein the mixing reactor includes a device for measuring the pH of the medium connected to a means situated on the intake for the basic reagent for regulating automatically the added quantity thereof.

10. The device according to claim 9, wherein the ammonia-extracting reactor or degassing reactor comprises a lower part collecting in particular the basified liquid effluent and an upper part in which there is situated a diffusion rack provided with nozzles, connected at the lower part to said reactor and including a feed pump, openings being arranged between the two parts to allow exterior air to enter, and an exhaust air fan being connected to said upper part.

11. The device according to claim 10, wherein the diffusion rack includes nozzles of the cyclone type.

12. The device according to claim 10, wherein the upper part of the degassing reactor is connected to a moisture-reducing unit.

13. The device according to claim 12, further comprising a washing tower connected to the moisture-reducing unit allowing the ammonia to be collected or eliminated.

14. The method according to claim 1, wherein said animal manure is pig slurry and said method removes approximately 40% of said ammoniacal nitrogen from said pig slurry with a slurry flow rate of approximately 3–10 m³ per hour.

15. The method according to claim 1, wherein said animal manure is pig slurry and said method removes approximately 60% of said ammoniacal nitrogen from said pig slurry with a slurry flow rate of approximately 2–8 m³ per hour.

16. The method according to claim 1, wherein said animal manure is pig slurry and said method removes approximately 80% of said ammoniacal nitrogen from said pig slurry with a slurry flow rate of approximately 1–4 m³ per hour.

17. The method according to claim 1, wherein said animal manure is pig slurry and contains approximately 1800 ppm of nitrogen as ammonia.

18. The method according to claim 17, wherein said method removes approximately 40% of said ammoniacal nitrogen from said pig slurry with a slurry flow rate of approximately 3–10 m³ per hour.

19. The method according to claim 17, wherein said method removes approximately 60% of said ammoniacal nitrogen from said pig slurry with a slurry flow rate of approximately 2–8 m³ per hour.

20. The method according to claim 17, wherein said method removes approximately 80% of said ammoniacal nitrogen from said pig slurry flow rate of approximately 1–4 m³ per hour.

* * * * *